Feb. 25, 1958 J. A. COMPTON 2,824,522
PUMP, PRESSURE LOADED WITH OFFSET LOADING
Filed May 19, 1950 2 Sheets-Sheet 2
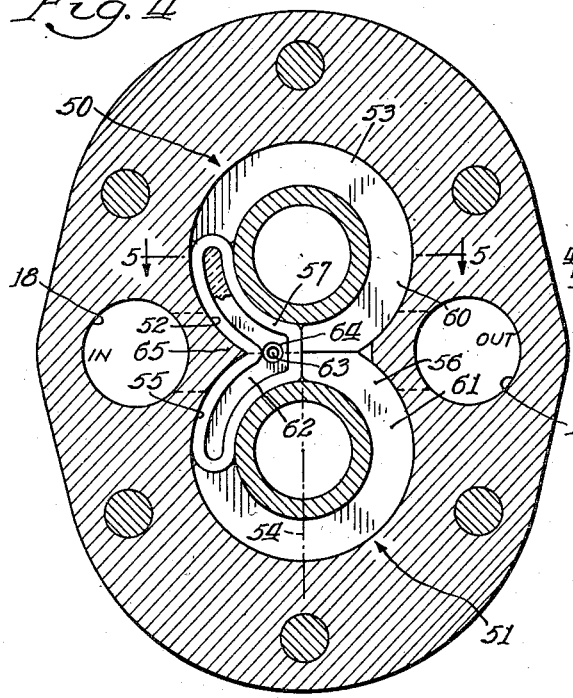
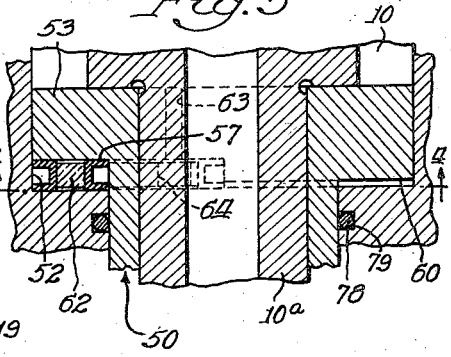
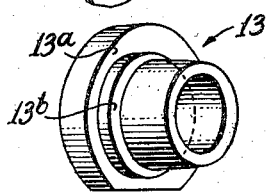
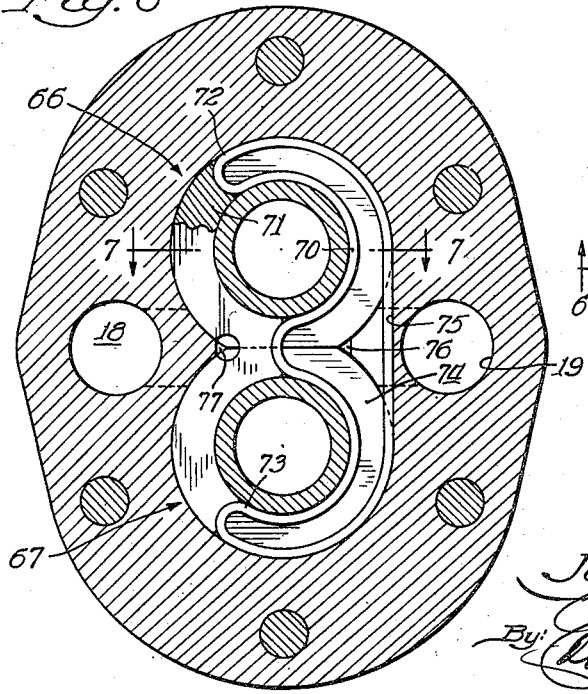
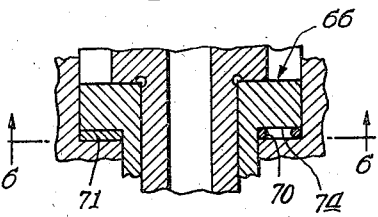
Inventor:
James A. Compton United States Patent Office 2,824,522
Patented Feb. 25, 1958

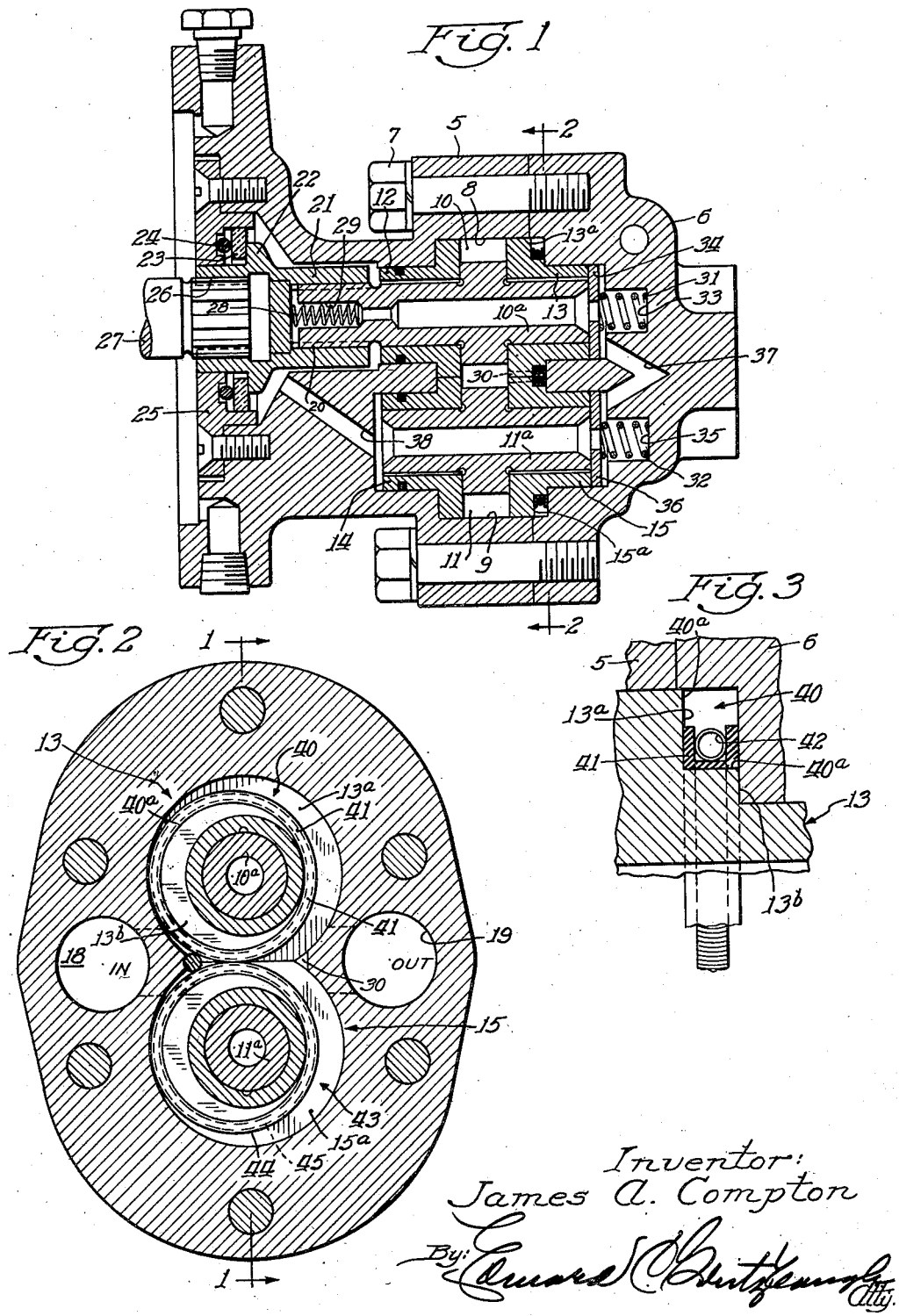

2,824,522

PUMP, PRESSURE LOADED WITH OFFSET LOADING

James A. Compton, South Euclid, Ohio, assignor to Borg-Warner Corporation, Chicago, Ill., a corporation of Illinois Application May 19, 1950, Serial No. 163,011

30 Claims. (Cl. 103—126)

This invention relates to a gear pump, and more particularly to a gear pump of the type employing pressure loaded bushings, such gear pumps sometimes being referred to as pressure loaded gear pumps.

In a pressure loaded gear pump of the type having one set of axially movable pressure loadable bushings, a part of the output or discharge pressure of the pump is applied to the rear or motive surfaces of the axially adjustable bushings to urge these bushings into sealing engagement with their associated gears. As disclosed in U. S. Patent No. 2,420,622 to Roth et al., by carefully selecting the relative areas of the forward surfaces of the bushings and of the motive surfaces of the bushings, it is possible to control within very close limits the actual sealing pressure provided. In practice, this requires a somewhat higher force in the direction of seal than in the direction tending to open the seal.

In the usual form of pressure loaded pump, the pressure loaded motive chamber to which output pressure is supplied is substantially uniformly subjected to output pressure. That is to say, at any point on the motive surface at the rear of the bushing the same pressure will exist. This is not true of the forward or gear side surface engaging face of the bushing. This latter face is normally subjected to a distinct pressure gradient extending from the inlet pressure in the area adjacent the pump inlet, which is the lowest pressure of the gradient, to the outlet pressure in the area adjacent the discharge side of the pump, at which area the pressure gradient is at its highest level. Accordingly, it will be evident that while the total pressure forces acting on the motive surfaces of the bushings of the pump may be made to equal the total pressure forces acting on the forward surfaces of the movable bushings, or to exceed these latter forces, the pressures acting on particular areas of the forward surfaces will not be uniform and that the portion of the bushing surfaces nearer the inlet side will be subjected to a lesser pressure, tending to break the seal, than the portion of the forward bushing surfaces nearer the outlet side of the pump. This unbalanced condition tends to twist the bushing in the pump and results in uneven wear, thereby increasing the power required to turn the pump. Wear is, of course, concentrated on the inlet side of the pump.

It has been found that this unbalanced condition can to some extent be reduced by providing balancing grooves on the gear side face engaging surfaces of the pressure responsive bushings, these balancing grooves communicating at one end with the discharge side of the pump and extending coaxially of bushings toward the inlet port of the pump but terminating short thereof. The balancing grooves tend to render the pressure uniform over a larger area of the gear side face engaging surface than without the grooves. It will be evident, however, that it is not possible to extend the balancing grooves completely around the pump without providing a leakage path to the inlet side of the pump from the outlet side with consequent loss of pressure. Thus, while balancing grooves are helpful, they do not and cannot result in a perfectly balanced pump.

It has been further proposed to employ eccentrically disposed, pressure loadable bushings whereby the annular pressure area at the back of each bushing is offset with respect to the concentrically disposed annular area at the forward surface of the bushings so as to compensate, in effect, for the pressure gradient extending across the forward surface of the bushing. This method has met with considerable success and the present invention is directed to a modification thereof.

An object of the present invention is to provide a new and improved pressure loaded type intermeshing gear pump.

A further object of the present invention is to provide a pressure loaded type intermeshing gear pump wherein the motive surface areas of the pressure loadable bushings are controlled as to extent and location to establish a loading pressure area of such a configuration as to have an effective force gradient substantially equivalent to the pressure gradient extending across the forward surfaces of the bushings.

In accordance with one embodiment of this invention, a pressure loaded type intermeshing gear pump having one set of axially movable, pressure loadable bushings may be provided with sealing means whereby the motive surface area of each bushing is confined to a restricted portion of the back surface of the bushing which is offset with respect to the gear side face engaging surface of the bushing. The remaining portion of the back surface of the bushing may or may not be directly vented to a low pressure zone or to inlet pressure.

Other objects and advantages of the present invention will be apparent from the following detailed description thereof taken in conjunction with the drawings wherein:

Fig. 1 is a fragmentary, axial, sectional view of a pressure loadable type intermeshing gear pump having one set of axially movable, pressure loadable bushings constructed in accordance with this invention;

Fig. 2 is a transverse, sectional view taken substantially along the line 2—2 of Fig. 1 and showing to advantage the eccentric arrangement of the sealing means on the motive surfaces of the pressure loadable bushings:

Fig. 3 is a greatly enlarged, detail, sectional view of the back of the upper, right bushing in Fig. 1;

Fig. 3A is a perspective view of a pressure loadable bushing, showing to advantage the transversely offset, shouldered area;

Fig. 4 is a view similar to Fig. 2 showing a different sealing arrangement;

Fig. 5 is an enlarged, detail, sectional view of the sealing means of Fig. 4, the view being taken substantially along the line 5—5 of Fig. 4;

Fig. 6 is a view similar to Figs. 2 and 4 showing another type of sealing arrangement; and Fig. 7 is a sectional view taken substantially along the line 7—7 of Fig. 6.

In order to simplify the description of this invention, it is shown and described herein in a pressure loaded gear type pump of the general type shown and described in U. S. Patent No. 2,420,622 to Roth et al. It will, however, be apparent that the present invention is equally applicable to other types of pressure loaded pumps.

Referring now to Fig. 1, a sectional pump housing is there illustrated comprising a main body portion 5 and a right closure or cover member 6. These two sections are securely bolted together as by threaded stud bolts 7 carried by the body portion 5 and threaded into the closure member 6. The two housing sections cooperate to define a pair of parallel, intersecting bores or pump gear chambers 8 and 9, receiving in complementary relationship intermeshing pumping gears 10 and 11 which are rotatably journalled therein. The chambers 8 and 9 are suitably formed to receive and support on either side of the pumping gears 10 and 11 bearing or bushing means 12, 13 and 14, 15, respectively. These bushings are radially flanged at their ends adjacent the gear side surfaces while their tubular body portions or barrels extend in opposite directions away from the pump gears, the body portions providing journal support for the pump gear shafts 10-a and 11-a. Low pressure liquid is introduced into the pump housing at inlet 18 and high pressure liquid is delivered from the outlet 19, the inlet and outlet passages communicating, respectively, with the inlet and discharge sides of the intermeshing pumping gears.

In the embodiment illustrated, the upper pumping gear 10 is the driving gear and, accordingly, the left end portion of gear journal 10-a is extended to the left to provide an externally splined coupling termination 20. The coupling termination 20 is received in the recessed right end of an internally splined coupling and packing member 21, having a radially extending flange 22 engaging a bearing ring 23, the opposite side of which ring presses against a flexible ring seal 24, retained against a similarly recessed portion of an annular retainer plate 25, mounted on and secured to the left side of housing section 5. Coupling member 21 terminates at its outer end in an internally splined connector recess 26 adapted to be engaged in driving relation with an auxiliary power shaft, such as shaft 27, of an aircraft engine or other driving mechanism. Compression spring 28 received in axially extending chamber 29 formed in the coupling termination 20 at the left end of gear shaft 10-a tends to urge the coupling member 21 to the left, thus eliminating initial end play and effecting an initial sealed engagement of flange 22, ring 23 and flexible seal 24. In the operation of this pump, the intermediate liquid pressure communicated to the seal, as explained in detail in the above-referred-to Patent No. 2,420,622, is effective to maintain operation of the seal assembly.

It will be noted that the flanged bushings 13 and 15 disposed, respectively, on the right sides of gears 10 and 11 are fitted into the bores 8 and 9 with sufficient clearance to permit slight, axial movement of the bushings with respect to the bores. In the operation of this pump, discharge pressure generated by the intermeshing gears is communicated from the outlet or discharge side thereof to the annular pressure loading chambers defined by the rear flanged surfaces 13-a and 15-a of the bushings 13 and 15, the adjacent walls of the housing section 6 and the barrel portions of the bushings, through an axially extending passage 30 formed between the peripheries of the flanged portions of the bushings 13 and 15 on the discharge side of the pump at the point of convergence of the bushings. The passage 30 extends from the discharge side of the gears to the right, as viewed in Fig. 1, to the intercommunicating portions of the pressure loading chambers at their point of juncture. Initial loading pressure is provided by helically coiled springs 31 and 32, respectively, the spring 31 being associated with the upper bushing 13, and the spring 32 being associated with the lower bushing 15. More particularly, spring 31 has its right portion disposed in a cylindrical recess 33 formed in the cover member 6, and its left end bears against an annular disc 34 disposed in the right end of bore 8 and engaging at its left side of the right end of bushing 13. A similar arrangement is provided for the spring 32, which is disposed in a recess 35 and bears against annular plate 36. Pressure escaping rearwardly from the loading chambers is vented through two rearwardly extending converging passages 37 either to inlet pressure or by a relief valve (not shown) set to an intermediate pressure valve between discharge pressure and inlet or sump pressure. Pressure is communicated to the shaft seal assembly at the left end of the pump housing through the central passages in the hollow gear journals and a passage 38 formed in the pump housing.

Since the pump so far described is substantially identical with that shown in U. S. Patent No. 2,420,622, further detailed description of the general features and structure thereof is believed unnecessary.

In the operation of a gear pump of the type here shown, a pressure gradient exists across the faces of the bushings adjacent the gears, the pressure gradient extending from a pressure value equivalent to the inlet pressure of the pump at the inlet side thereof to the discharge pressure of the pump at the outlet side thereof. On the other hand, the pressure loading pressure applied to the motive loading surfaces 13-a and 15-a is substantially uniform over the full extent thereof. It will be apparent, therefore, that since the gear side face pressure acting against the loading pressure in the area adjacent the discharge side of the pump far exceeds the gear side face pressure acting against the loading pressure in the area adjacent the inlet side of the pump, the axially movable bushings 13 and 15 will tend to engage the gear side faces with a correspondingly greater force adjacent the inlet side. This unbalanced arrangement results in increased wear, and more particularly, uneven wear, resulting in accelerated deterioration of the pump. The present invention is designed to overcome this unbalanced condition.

Referring now particularly to Figs. 2 and 3, it will be apparent that the motive surface 13-a of the upper bushing 13 is recessed radially inwardly from its periphery to provide a substantially circular recess 40 which is located eccentrically with respect to the flanged portion of the bushing and to the axis of the bushing, the recess having its center offset to the left and thus nearer the inlet side of the pump than the outlet side. Around the inner wall 40a of the recess there is positioned a seal 41 comprising an annular, U-shaped member of suitable material, such as rubber or neoprene, the open portion of the seal ring 41 facing outwardly. In order to hold apart the side members or lips of the seal, resilient means designated generally at 42 may be positioned between the side members or lips. This resilient means may comprise, for example, a garter spring or other resilient member such as a rubber ring of suitable resilient characteristics. It is also feasible to employ an O-ring for the seal ring 41 but the U-shaped ring, shown in detail in Fig. 3, has been found preferable due to its characteristic of spreading slightly in an axial direction when fluid pressure is applied thereto. A similarly disposed recess 43, seal 44 and spring 45 are employed in conjunction with the lower bushing 15.

Upon application of discharge pressure to the motive surfaces of the bushings, the lips of the seal will tend to be forced apart, thus increasing the sealing force and the area 13-b at the back of the bushing within the ring will be, in effect, isolated from the motive surface area. Since the ring seal is eccentrically disposed with respect to the back surface of the bushing, it will be evident that the area of the motive surface 13-a exposed to discharge pressure adjacent the inlet side of the pump will be substantially less than the area of the motive surface adjacent the discharge side of the pump. By suitably positioning the ring seal 41, the pressure gradient across the gear side surface engaging face of the bushings may be closely compensated.

Area 13-b, the area at the back of the bushing having its perimeter defined by seal 41, is normally spaced from the adjacent end wall of the housing and vented to low pressure through passages 37 and 38, which is explained hereinbefore, may be communicated directly to inlet or sump pressure or to a zone of intermediate pressure. Where the area 13-b is vented to inlet pressure, it will be evident that the area 13-b is responsive to inlet pressure and will, therefore, compensate for high inlet pressure changing the normal characteristic of the pressure gradient across the gear side face engaging surface of the bushing.

As an alternative to the construction shown in Figs. 1, 2 and 3 wherein a specific area of each of the axially movable bushing's rear surfaces is sealed off or isolated from discharge pressure to define an offset motive surface area 13–a exposed to discharge pressure, there may be employed the arrangement shown in Figs. 4 and 5 wherein a pair of axially movable bushings 50 and 51, corresponding to bushings 13 and 15, respectively, are employed. A recess 52 is formed in the lower left side of the flanged portion 53 of upper bushing 50 starting at or adjacent vertical center line 54 of the two bushings and extending to the left and upwardly approximately one-quarter of the distance around the bushing, the radially inner wall of the recess comprising, in effect, a forward extension of the barrel portion bushing on its left side. A similar recess 55 is formed in the upper left side of the flanged portion 56 of lower bushing 51 and is located in complementary relation to the recess 52. Both recesses are arranged so that their opposed ends are in communication when the bushings 50 and 51 are assembled in the pump, thus defining a kidney-shaped recessed area. Within this area is positioned a seal ring 57 having a length such that it fits closely the wall of the recessed area and when the bushings are assembled in the pump housing will bear against the adjacent surface of the housing bore wall in sealing relation. The purpose of the seal ring is to prevent discharge pressure communicated to the restricted, offset motive surface areas 60 and 61, respectively, of the bushings from reaching the area within the seal, that is, to reduce the area of the rear surface of each bushing adjacent the inlet of the pump which is exposed to discharge pressure. The seal ring may be an O-ring but in practice it has been found desirable to employ a U-shaped seal ring, which may be made of rubber or neoprene or like material, similar to the ring 41 of Figs. 1, 2 and 3. Disposed within the seal is an insert 62 which may be formed of metal, plastic or other suitable material to hold the seal ring against the walls of the recesses and the wall of the housing. The insert may be made in one piece, as shown, or two pieces where desired, and also has a somewhat kidney-shaped configuration. It is made to have a thickness slightly less than that of the seal ring and of the depth of the recesses.

Vent passage or bleed passage 63 is provided to permit escape of fluid leaking past the seal into the kidney-shaped, isolated area. This passage may be formed, as illustrated, partially in the adjacent side surfaces of each bushing and extends to the inlet of the pump, thus venting the area within the seal ring to inlet pressure. Aperture 64 in the mid portion of insert 62 communicates with the vent passage 63. It will be understood that in the absence of such a venting passage, pressure would eventually accumulate in this isolated area and ultimately reach the same value as the pressure on the desired motive surface areas 60 and 61. The vent passage may be connected, as shown, to the inlet port of the pump or to any other zone of relatively low pressure. Where vented to inlet pressure, it will be evident that the isolated area within seal 57 will then respond to inlet pressure as described in greater detail in my co-pending application, Serial No. 163,012 filed May 19, 1950, now Patent No. 2,695,566.

The area of the recesses 52 and 55 may be increased or reduced as desired to expose a greater or lesser area at the back of the bushings outside the seal to discharge pressure and, conversely, a lesser or greater area within the seal to inlet or intermediate pressure. Also, in practice, it may not be desirable to employ as sharp a configuration as that illustrated in Fig. 4 at the point designated 65. The adjacent apex of the two converging housing walls may then be slightly relieved or recessed to the left to reduce the angularity of the seal configuration in this area. This is shown in Fig. 6 where, however, the adjacent housing portion is recessed at 75 primarily to permit discharge pressure to reach the sealed-in area.

In some cases it is undesirable to recess the back of the bushings as shown in Figs. 4 and 5 or to provide the grooves as shown in Figs. 1, 2 and 3. In such cases the arrangement disclosed in Figs. 6 and 7 may then be employed. In the arrangement shown in Figs. 6 and 7 substantially conventional flanged bushings 66 and 67 are mounted in the pump housing, these bushings being similar to the pressure loadable bushings described in the aforementioned Roth et al. patent, except that sufficient clearance is provided between the rear, or motive, surfaces of these bushings and the back wall of the housing bore to permit insertion of a seal ring 70, best shown on Fig. 6.

The seal ring 70 defines within its border the motive surface area 74 exposed to discharge pressure, this area comprising approximately the right half of the rear surface of each flange. This area may be extended or reduced as required by lengthening or shortening the seal ring. On the other side of the barrel portion of the bushings there is positioned an irregularly shaped, flat insert or seal retainer plate 71 having a thickness slightly less than the thickness of the seal ring. This insert lays flatly against the flanged portions of the bushings, being disposed between the flanged portions and the adjacent rear surface of the housing bores. The terminal ends of the two arcuate finger-like members 72 and 73, forming the insert, butt against the left upper and lower terminations of the seal ring adjacent the vertical centerline of the pump. In this manner, when discharge pressure is applied to the primary motive surface area 74 of the two bushings, the seal ring is prevented from expanding at its outer ends to the left in the direction of the inlet. The center portion of the insert 71 similarly butts, at its right side, against the adjacent left side of the center portion of the seal ring.

A recess or niche 75 is formed in the leftwardly converging center portion of the right wall of the pump housing adjacent the back of the flanged portion of the bushings to permit straightening the seal ring rather than have the sharp bend shown at 65 in Fig. 4 and to prevent the seal ring from interfering with communication of discharge pressure from the outlet side of the pump through a passage 76 to the motive surface 74. Passage 76 corresponds to passage 30 in Figs. 1, 2 and 3 and is similarly formed.

In the operation of a pressure loaded pump equipped with one set of axially movable bushings of the type illustrated in Figs. 6 and 7, discharge pressure is communicated to the primary motive surface area 74 through passage 76. This pressure expands the seal 70 against the side of the housing and against the adjacent sides of the two bushing barrel portions as well as the ends and mid portion of the insert 71. At the same time the seal expands axially of the bushing to prevent leakage due to movement of the bushing into sealing relation. Pressure fluid leaking past the seal into the area of the bushings covered by insert 71 may be vented through a passage 77 forward to the inlet side of the pump or through a clearance passage backward to the rear of the pump bore and from there as explained in conjunction with the embodiment illustrated in Figs. 1, 2 and 3.

In the embodiment illustrated in Figs. 4 and 5, in order to prevent escape of pressure rearwardly between the bushing barrel and the adjacent housing bore wall, a seal ring 78 is preferably fitted around the bushing barrel immediately below the flanged portion of the bushing as shown in Fig. 5. The bushing seal 78 may be positioned in a recess or groove 79 formed in the housing bore. In the embodiment shown in Figs. 6 and 7, this seal ring has been found to be unnecessary due to the disposition of the seal 70.

In order to facilitate description, the bushings have been described as generally cylindrical in configuration, this being the conventional pump bushing form. It will be understood, however, that the present invention is equally applicable to other curvilinear or angular constructions and that the recessed and offset areas may likewise have a curvilinear or angular configuration. Generally, however, the cylindrical configuration shown is more suited to mass production techniques.

Where herein the various parts of this invention have been referred to as being located in a right or a left position, or an upper or lower position, it will be understood that this is done solely for the purpose of facilitating description and that such references relate only to the relative positions of the parts as shown in the accompanying drawings.

It will be evident that the embodiment of the invention shown in Figs. 6 and 7 is merely illustrative and that by combining the teaching thereof with that of Figs. 4 and 5 a similar seal ring could be employed adjacent the inlet side instead of the outlet side of the bushings. In this event, of course, an insert such as insert 62 in Figs. 4 and 5 would be required to prevent collapse of the ring upon application of discharge pressure. This modification would avoid the necessity of recessing the backs of the bushings.

What is claimed is:

1. An intermeshing gear type pump having pumping gears and having bearing means embracing axially extending gear journals in journal relation and sealably engaging the corresponding gear side faces, said gear journals extending axially through said bearing means and said bearing means being particularly characterized by being each formed in a single unitary piece and axially movable independently of said pumping gears, a first pressure responsive motive surface provided on said bearing means and eccentrically disposed with respect to the axis of said journals, and a second pressure responsive motive surface provided on said bearing means oppositely eccentrically disposed with respect to the axis of said gear journals, said two surfaces being axially displaced one from the other, sealing means isolating said first and second motive surfaces, and passage defining means for continuously communicating inlet pressure to said first surface and discharge pressure to said second surface.

2. An intermeshing gear type pump having pumping gears and having bearing means embracing axially extending gear journals in journal relation and sealably engaging the corresponding gear side faces, said gear journals extending axially through said bearing means, said bearing means being axially movable independently of said pumping gears, a first pressure responsive motive surface provided on said bearing means and eccentrically disposed with respect to the axis of said journals, and a second pressure responsive motive surface provided on said bearing means oppositely eccentrically disposed with respect to the axis of said gear journals, said two surfaces being axially displaced one from the other, sealing means isolating said first and second motive surfaces, and passage defining means for continuously communicating inlet pressure to said first surface and discharge pressure to said second surface.

3. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, an axially apertured end plate of unitary construction received in said pump chamber and adapted to engage the side surface of said rotatable member in pumping seal relation, a first, continuous annular surface area on said end plate facing away from said rotatable member and normally spaced from the adjacent end wall of said housing, means defining a passage communicating fluid at discharge pressure to said first surface area to urge said end plate toward said rotatable member, a second surface area on said end plate engageable with the adjacent side surface of said rotatable member to provide a pumping seal therewith, said second surface area being subject to a pressure gradient extending from a minimum value adjacent the inlet of the pump chamber to a maximum value adjacent the outlet of the pump chamber, a third, continuous annular surface area on said end plate facing away from said rotatable member and normally spaced from the adjacent end wall of said housing, said first and third surface areas being eccentrically disposed with respect to said second surface area and lying in spaced planes substantially parallel with respect to each other, and means defining a passage communicating with said third area to a source of pressure less than discharge pressure whereby said third area will be responsive to said last-mentioned pressure.

4. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, an axially apertured end plate of unitary construction received in said pump chamber and adapted to engage the side surface of said rotatable member in pumping seal relation, a first, continuous annular surface area on said end plate facing away from said rotatable member and normally spaced from the adjacent end wall of said housing, a second surface area on said end plate engageable with the adjacent side face of said rotatable member to provide a pumping seal therewith, said second surface area being subject to a pressure gradient extending from a minimum value adjacent the inlet of the pump chamber to a maximum value adjacent the outlet of the pump chamber, a third, continuous annular surface area on said end plate facing away from said rotatable member and normally spaced from the adjacent end wall of said housing, said first and third surface areas being eccentrically disposed with respect to said second surface area and lying in spaced planes parallel with respect to each other, passage defining means effective to direct pressure liquid generated by said rotatable member to the first surface area of said end plate assembly for urging the end plate in the direction of the adjacent gear side face, and passage defining means effective to direct pressure liquid admitted to said pump at said inlet to the third surface area of said end plate for urging the end plate in the direction of the gear side face in sealing relation.

5. A fluid pump including a housing and a rotatable member, an axially apertured pressure loadable end plate means associated with said pumping member and movable axially independently thereof, a first area on said end plate means facing and adapted to engage said pumping member in pumping seal relation, a second area on said end plate facing in a direction opposite to the first area and subject to pump discharge pressure, a third area on said end plate facing in the same direction as the second area and axially displaced with respect to said second area and offset with respect to the axis of said end plate, and means including sealing means located between said second and third areas, said means including sealing means cooperating with said housing to isolate said second area from said third area whereby said means including sealing means and said third area will operate to define said second area as an area eccentric to the axis of the end plate means.

6. A pump as claimed in claim 5 wherein said means including sealing means surrounds said third area and encircles the axis of said end plate means.

7. A pump as claimed in claim 5 wherein said third area is subject to a pressure less than discharge pressure to be responsive thereto.

8. In a pressure loaded pump having a rotatable pumping member, an axially apertured bushing having a first motive surface intermediate the ends of said bushing arranged to respond to inlet pressure to move said bushing in sealing relation with said pumping member and defined by sealing means disposed in contact with said bushing, conduit defining means for continuously directing inlet pressure to said first motive surface, a second motive surface on said bushing arranged to respond to pump discharge pressure to move said bushing into sealing relation with said pumping pressure, and conduit defining means for continuously directing pump discharge pressure to said second motive surface, said second motive surface being axially displaced from said first motive surface and having its center eccentric with said first motive surface.

9. A pump in accordance with claim 8 wherein said bushing is formed in a single piece.

10. In a pressure loaded pump having a rotatable pumping member, an axially apertured bushing having a first annular motive surface intermediate the ends of said bushing and eccentrically disposed with respect to the axis of rotation of said pumping member arranged to respond to pump inlet pressure to move said bushing into sealing relation with said pumping member and defined by sealing means disposed in contact with said bushing, conduit means for continuously directing inlet pressure to said first motive surface, a second annular motive surface on said bushing eccentrically disposed with respect to the axis of rotation of said pumping member arranged to respond to pump discharge pressure to move said bushing into sealing relation with said pumping member, and conduit defining means for continuously directing discharge means to said second motive surface, said bushing motive surfaces being eccentrically disposed with respect to the axis of said bushing aperture.

11. A pump in accordance with claim 10 wherein the said surfaces are oppositely eccentrically disposed with respect to each other.

12. In a high pressure pump, a housing having an inlet and an outlet and providing a pumping chamber, a rotatable pumping member rotatably mounted in said pumping chamber adapted to transfer fluid from said inlet to said outlet and providing during operation thereof unequal pressure gradient forces in said pumping chamber, a backing plate for said chamber in said housing having a pressure receiving back surface facing away from said pumping chamber, an adjacent side wall of said housing spaced from said pressure receiving back surface, sealing means operatively arranged between said backing plate and said housing and forming a pressure control chamber, and means placing said pressure control chamber in communication with said outlet, said sealing means being axially expanded in response to pressure in said pressure control chamber and defining said back surface whereby the latter increases proportionately in area from the pump inlet to the pump outlet for compensation of the uneven pressure forces in the pumping chamber.

13. In a high pressure pump; a housing having an inlet and an outlet and providing a pumping chamber; shiftable bearing means closing one end of said chamber and being subject to pressures in the chamber which increase toward the outlet side of the chamber; sealing means arranged to encircle a portion of said shiftable bearing means; a back face on said shiftable bearing means facing away from said pumping chamber; an adjacent side wall of said housing spaced from said back face; said sealing means, back face and adjacent side wall of said housing forming a pressure control chamber; the inner periphery of said back face being defined by said sealing means and having an effective area increasing in size from the inlet side to the outlet side of the pump to produce forces urging the bearing means toward the pumping chamber in proportion to the unequal forces urging the bearing means away from the pumping chamber; and means communicating outlet pressure to said pumping chamber.

14. In a high pressure pump including a body having a pumping chamber with an inlet and an outlet and a rotatable pumping member disposed in said chamber; a bearing means having means defining a tubular bearing portion and means defining a plate portion; and adjacent side wall of said body spaced from said plate portion; sealing means arranged to encircle said tubular bearing portion and to define with said plate portion and said side walls a chamber behind said plate portion and to further define said plate portion eccentric relative to the rotational axis of the pumping member; and means providing a passage in communication with the pump discharge and said chamber, whereby the pressure loads on said plate portion compensate the pressure loads in said pumping chamber.

15. In a fluid pump of the type including a housing having an inlet and outlet port formed therein, a rotatable pumping member journalled in said housing for transferring fluid from said inlet to said outlet, axially movable end plate means adapted to engage said pumping member in sealing relation and axially movable independently of said rotatable pumping member, a continuous generally annular motive surface on said end plate means adapted in response to application of pressure thereto to urge said end plate toward said rotatable member to establish said sealing relation, a side wall of said housing spaced from said motive surface, conduit defining means for continuously communicating pressure generated by said pump to said motive surface, and sealing means operatively disposed adjacent said annular motive surface and adapted in response to the application of pressure on said motive surface to axially expand against said motive surface and said side wall to define the inner periphery of said motive surface, said motive surface having a generally circular outer periphery concentrically disposed with respect to the axis of rotation of the pumping member and a generally circular inner periphery eccentrically disposed with respect to the axis of said pumping member, said inner periphery having its center offset toward said inlet port.

16. A fluid pump having a suction side, a discharge side, a rotatable pumping member, and axially movable, pressure loadable end plate means having a continuous, graduated discharge pressure responsive motive surface having a major area and a minor area, said end plate means being movable with respect to said pumping member and engageable at a surface opposite to said motive surface with an adjacent side face of said pumping member in sealing relation, sealing means encircling the axis of the pumping member arranged to define the major and the minor area of said motive surface by sealably engaging said motive surface in response to pressure generated by said pump, the major area of said motive surface being located on said discharge side and the minor area of said motive surface being located on said suction side, and conduit defining means for continuously communicating pressure generated by said pump to said motive surface.

17. A gear pump comprising a casing having one opened end and a pumping cavity therein having an inlet side and an outlet side, a cover for closing said opened end, intermeshing gear impellers in said pumping cavity having axially extending journals, pairs of bushings in said casing encompassing said journals, at least one pair of said bushings being axially movable with respect to said impellers, said movable bushings having inner faces forming the inner ends of said bushings and adapted to form end walls for said pumping cavity and to make endwise sealing contact with the sides of said impellers, each of said movable bushings having an outer face facing the covered end of said casing, a chamber formed in part by said outer face, means for dividing said chamber into a first low pressure zone adapted to be vented to the inlet side of said pump and into a second high pressure zone adapted to receive high pressure fluid from the outlet side of said pump, said dividing means comprising an endless flexible sealing member isolating one of said zones from the other of said zones, means venting the low pressure zone to the inlet side of said pump, a fluid passage connecting the high pressure zone to the outlet side of said pump, and means providing a rigid profiled member embraced by and maintaining the shape of said sealing member.

18. A gear pump comprising a casing having one opened end and a pumping cavity therein having an inlet side and an outlet side, a cover for closing said opened end, intermeshing gear impellers in said pumping cavity having axially extending journals, said casing and cover being provided exclusively with bores concentric with respect to the axes of said gear impellers, pairs of bushings in said casing encompassing said journals, at least one pair of said bushings being axially movable with respect to said impellers, said movable bushings having inner faces forming the inner ends of said bushings and adapted to form end walls for said pumping cavity and to make endwise sealing contact with the sides of said impellers, each of said movable bushings having an outer face facing the covered end of said casing, a chamber formed in part by said outer face, means for dividing said chamber into a first low pressure zone adapted to be vented to the inlet side of said pump and into a second high pressure zone adapted to receive high pressure fluid from the outlet side of said pump, said dividing means comprising an endless flexible sealing member isolating one of said zones from the other of said zones, means venting the low pressure zone to the inlet side of said pump, a fluid passage connecting the high pressure zone to the outlet side of said pump, and means providing a rigid profiled member embraced by and maintaining the shape of said sealing member.

19. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, means defining an adjustable end plate axially movable independently of said rotatable member received in said pump chamber and having a first surface area facing away from said rotatable member and normally spaced from the adjacent end wall of said pump chamber, said end plate having a second surface area subject during the operation of the pump to the pressure gradient in said pump chamber and engageable with the adjacent side face of said rotatable member to provide a pumping seal therewith, passage defining means effective to continuously direct pressure liquid generated by said rotatable member to said first surface of said end plate defining means for urging the same in the direction of the adjacent rotatable member side face for maintaining a pumping seal therewith, a third surface area on said end plate facing away from said rotatable member and having its center offset with respect to the center of the second surface area, and sealing means associated with said first surface area cooperating with and axially expandable against an adjacent radial end wall and a portion of said end plate and located between said first surface area and third surface area to isolate the pressure acting on the first surface area from said third surface area and to define said first area to have its major portion adjacent the outlet side of the pump.

20. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, means defining an adjustable end plate axially movable independently of said rotatable member received in said pump chamber and having a first surface area facing away from said rotatable member and normally spaced from the adjacent end wall of said pump chamber, said end plate having a second surface area subject during the operation of the pump to the pressure gradient in said pump chamber and engageable with the adjacent side face of said rotatable member to provide a pumping seal therewith, passage defining means effective to continuously direct pressure liquid generated by said rotatable member to said first surface of said end plate means for urging the same in the direction of the adjacent rotatable member side face for maintaining a pumping seal therewith, a third surface area on said end plate means facing away from said rotatable member and having its center offset with respect to the center of the second surface area, and sealing means associated with said first surface area cooperating with and axially expandable against an adjacent radial end wall and a portion of said end plate means and located between said first surface area and third surface area to isolate the pressure acting on the first surface area from said third surface area and to define said second area to have its major portion adjacent the outlet side of the pump, and vent defining means for communicating inlet pressure to said third surface area whereby the loading force exerted against said third surface area is related to inlet pressure.

21. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, means defining an adjustable end plate axially movable independently of said rotatable member received in said pump chamber and having a first surface area facing away from said rotatable member and normally spaced from the adjacent end wall of said pump chamber, said end plate having a second surface area subject to the pressures in said pump chamber and engageable with the adjacent side face of said rotatable member to provide a pumping seal therewith, said end plate having a third surface area facing away from said rotatable member, means including sealing means associated with said first surface area and cooperating with and axially expandable against an adjacent radial end wall and a portion of said end plate means and located between said first surface area and third surface area to isolate the pressure acting on the third surface area, said third surface area being axially offset with respect to said second surface area.

22. A fluid pump in accordance with claim 21 wherein said sealing means comprises a seal ring of resilient material having a U-shaped configuration and resilient means disposed within said seal ring for urging the sides thereof apart.

23. A fluid pump in accordance with claim 21 wherein said sealing means comprises a ring of resilient material having a U-shaped configuration and a garter spring disposed within said U-shaped portion of said ring to urge the sides thereof apart and into sealing relation with said portion of said end plate and the adjacent end wall of said pumping chamber, respectively.

24. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, an axially apertured end plate of unitary construction received in said pump chamber and adapted to engage the side surface of said rotatable member in pumping seal relation, a first, continuous annular surface area on said end plate facing away from said rotatable member and normally spaced from the adjacent end wall of said housing, a second surface area on said end plate engageable with the adjacent side surface of said rotatable member to provide a pumping seal therewith, said second surface area being subject to a pressure gradient extending from a minimum value adjacent the inlet of the pump chamber to a maximum value adjacent the outlet of the pump chamber, a third, continuous annular surface area on said end plate facing away from said rotatable member and normally spaced from the adjacent end wall of said housing, said first and third surface areas being eccentrically disposed with respect to said second surface area and lying in spaced planes substantially parallel with respect to each other, means communicating outlet pressure to said first surface area, and means communicating inlet pressure to said third surface area, said last two-named means being effective to urge said end plate in the direction of the adjacent side surface of said rotatable member.

25. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, an axially apertured end plate of unitary construction received in said pump chamber and adapted to engage the side surface of said rotatable member in pumping seal relation, a first, continuous annular surface area on said end plate facing away from said rotatable member and normally spaced from the adjacent end wall of said housing, a second surface area on said end plate engageable with the adjacent side surface of said rotatable member to provide a pumping seal therewith, said second surface area being subject to a pressure gradient extending from a minimum value adjacent the inlet of the pump chamber to a maximum value adjacent the outlet of the pump chamber, a third, continuous annular surface area on said end plate facing away from said rotatable member and normally spaced from the adjacent end wall of said housing, sealing means located between said first surface area and said third surface area to prevent communication of pressure therebetween, said first and third surface areas being eccentrically disposed with respect to said second surface area and lying in spaced planes subtsantially parallel with respect to each other, means communicating outlet pressure to said first surface area, and means communicating inlet pressure to said third surface area, said last two-named means being effective to urge said end plate in the direction of the adjacent side surface of said rotatable member.

26. In a pressure generating pump of the type including a housing containing intermeshing gears and having an inlet leading to and an outlet leading from said housing, movable bushings and fixed bushings, each of said bushings having a forward surface engageable with the side face of said gears, said forward surface being subject to pressure gradient existing between the fluid pressure adjacent the inlet and the fluid pressure adjacent the outlet, said bushings further having flanged portions and barrel portions, said flanged portions being subject to discharge pressure to maintain sealing engagement with the gear side face of said pump, and means associated with said axially movable bushing for overcoming said pressure gradient comprising a first surface area on the side of said flange opposite the forward surface and subject to discharge pressure, a second surface area on said flange on the side opposite said forward surface area and subject to inlet pressure, said first and second surface areas being eccentrically disposed with respect to said forward surface area and lying in spaced planes substantially parallel with respect to each other.

27. A fluid pump comprising a housing having a pump chamber formed therein, means including a rotatable member received in said pump chamber effective to force fluid from said inlet out of said housing through said outlet, an axially apertured bushing defining means of unitary construction received in said pump chamber and adapted to engage the side surface of said rotatable pumping member in pumping seal relation; a first continuous annular surface area on said bushing defining means facing away from said rotatable pumping member and normally spaced from an adjacent end wall of said housing, a second surfce area on said bushing defining means engageable with the adjacent side surface of said rotatable member to provide a pumping seal therewith, said second surface area being subject to pressure gradient extending from a minimum value adjacent the inlet of the pump chamber to a maximum value adjacent the outlet of the pump chamber, a third, continuous annular surface area on said bushing defining means spaced from an adjacent end wall of said housing, and sealing means located between said first surface area and said third surface area to prevent communication of pressure therebetween, said sealing means further cooperating with a means including a portion of said housing to define said first and third surface areas eccentric with respect to said second surface area, means communicating outlet pressure to said first surface area, and means communicating inlet pressure to said third surface area, said last two-named means being effective to urge said bushing defining means in the direction of the adjacent side surface of said rotatable member.

28. In a high pressure pump including a body having a pumping cavity with an inlet and an outlet, and a rotatable pumping member; a bearing means in said cavity having end plate portions and a tubular bearing portion; said end plate portions being eccentrically displaced with respect to said tubular bearing portion; one of said end plate portions having its greater area in the region of the pump outlet and a second end plate portion having its greater area in the region of the pump inlet; sealing means disposed adjacent said end plate portions and encircling the axis of said pumping member; said bearing means, said sealing means and said body arranged to define a first and a second chamber behind said first and second end plate portions respectively; means providing a passage in communication with the pump discharge and said first chamber; and means providing a passage in communication with the pump inlet and said second chamber; whereby pressure forces in the pump cavity tending to cock the bearing means will be balanced by the pressure forces in said chambers.

29. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, an axially apertured end plate of unitary construction received in said pump chamber and adapted to engage the side surface of said rotatable member in pumping seal relation, a first, continuous annular surface area on said end plate facing away from said rotatable member and normally spaced from the adjacent end wall of said housing, a second surface area on said end plate engageable with the adjacent side surface of said rotatable member to provide a pumping seal therewith, said second surface area being subject to a pressure gradient extending from a minimum value adjacent the inlet of the pump chamber to a maximum value adjacent the outlet of the pump chamber, a third, continuous annular surface area on said end plate facing away from said rotatable member and normally spaced from the adjacent end wall of said housing, said first and third surface areas being eccentrically disposed with respect to said second surface area and lying in spaced planes parallel with respect to each other, means communicating outlet pressure to said first surface area, and means to direct inlet pressure to said third surface area, said inlet pressure directed to said third surface area compensating the change in the normal pressure gradient across said second surface area resulting from high inlet pressure.

30. In a high pressure pump including a body having a pumping cavity with an inlet and an outlet, and a rotatable pumping member; a bearing means in said cavity having end plate portions and a tubular bearing portion; said end plate portions being eccentrically displaced with respect to said tubular bearing portion; one of said end plate portions having its greater area in the region of the pump outlet and a second end plate portion having its greater area in the region of the pump inlet; sealing means disposed adjacent said end plate portions and encircling the axis of said pumping member; said bearing means, said sealing means and said body arranged to define a first and a second chamber behind said first and second end plate portions respectively; means communicating a different fluid presure to each of said chambers; whereby pressure forces in said pump cavity tending to cock the bearing means will be balanced by the pressure forces in said chambers.

References Cited in the file of this patent

UNITED STATES PATENTS

| | | |
|---|---|---|
| 1,780,109 | Berglund | Oct. 28, 1930 |
| 1,972,632 | Patton | Sept. 4, 1934 |
| 2,044,873 | Beust | June 23, 1936 |
| 2,312,655 | Lauck | Mar. 2, 1943 |
| 2,405,061 | Shaw | July 30, 1946 |
| 2,444,165 | Lauck | June 29, 1948 |